Patented May 15, 1928.

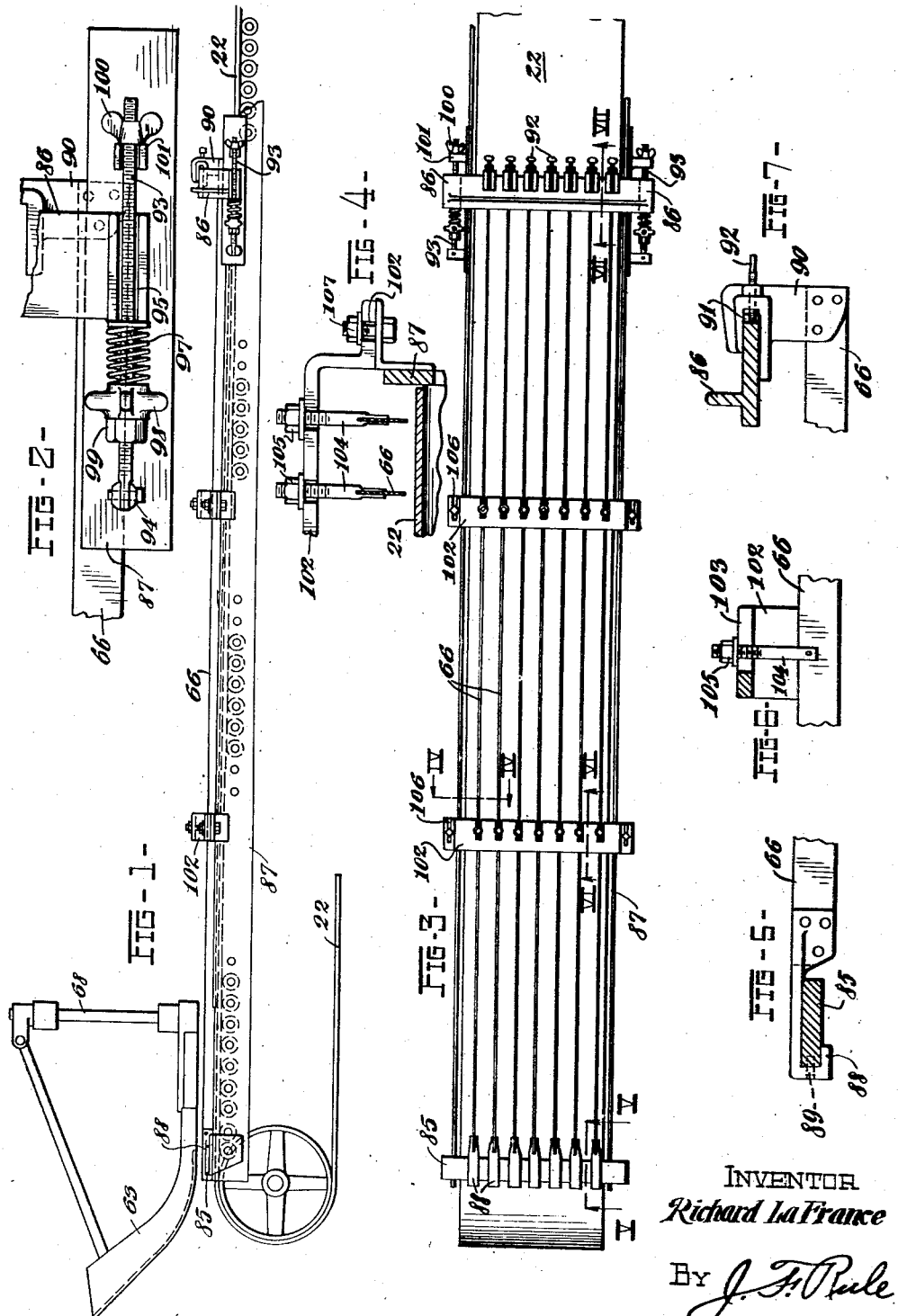

1,669,474

UNITED STATES PATENT OFFICE.

RICHARD LA FRANCE, OF TOLEDO, OHIO, ASSIGNOR TO THE OWENS BOTTLE COMPANY, OF TOLEDO, OHIO, A CORPORATION OF OHIO.

CONVEYING APPARATUS.

Original application filed April 22, 1924, Serial No. 708,171. Divided and this application filed April 23, 1926. Serial No. 104,040.

The present invention relates to an apparatus designed for receiving bottles, jars or other glass articles after they have been discharged from a forming machine and carrying them away from the machine. The apparatus which in this instance is shown in the form of an endless belt conveyor, may be used to transfer the articles to an annealing leer. In the particular form of the invention herein illustrated, the apparatus is designed for receiving and transferring a plurality of such articles at a time, which articles are delivered from a forming machine in multiples or groups. Such articles when they are discharged from the molds of a forming machine, are soft and plastic, and if they are permitted to come in contact with each other while in such hot soft condition there is a tendency for them to stick together.

An object of the present invention is to provide practical apparatus for transferring the bottles or other articles discharged from the molds, keeping them separated and preventing marring or distortion preliminary to and during the annealing stage, in so far as contact of the articles is concerned.

Other objects of the invention will appear hereinafter.

This application is a division of my co-pending application, S. N. 708,171, filed April 22, 1924.

In the accompanying drawings:

Fig. 1 is an elevation of the conveyor and guiding strips thereover.

Fig. 2 is a detail side elevation on a larger scale, showing a tensioning device for the guiding strips shown in Fig. 1.

Fig. 3 is a plan of the apparatus shown in Fig. 1, and

Figs. 4, 5, 6 and 7 are sectional elevations at lines IV—IV, V—V, VI—VI, and VII—VII, respectively, on Fig. 3.

The invention herein illustrated comprises a horizontal conveyor 22, which, in this instance, is of the endless belt type and may be used in conjunction with a primary receiving or transfer apparatus such as is disclosed in the above identified co-pending application. Bottles are fed to the conveyor 22 by way of an inclined chute 63, which is mounted to oscillate about the axis of a vertical shaft 68 as shown in Fig. 1. Guide strips (not shown) are formed upon the chute 63 for the purpose of preventing contact between the several articles of a group which are being guided by the chute to the conveyor. As the articles leave the chute 63 and are moved horizontally upon the conveyor 22, they are kept out of contact with each other and guided along the conveyor in parallel spaced relation by means of a plurality of guide strips 66.

By reference to the accompanying drawings, it will be noted that the guiding strips or ribbons 66 are mounted over the conveyor 22 and are of sufficient length to keep the bottles separated during their travel through a considerable distance, so that sufficient cooling and hardening of the bottles is insured before they pass beyond said strips. The strips 66 are preferably made of thin sheet metal, but may be of other material, and are anchored at their opposite ends respectively to transverse supporting bars 85 and 86 mounted on the frame 87 of the conveyor. Each strip 66 is provided at one end with a hook 88 to engage the bar 85. Pins 89 in the hooks 88 enter corresponding holes in the bar 85 to hold the strips 66 properly spaced along said bar. Each strip 66 at its opposite end has secured thereto a head 90 provided with a slot 91 to receive the bar 86. An adjusting screw 92 mounted in said head provides a means for adjusting the tension of the strip.

The bar 86 is connected to the conveyor frame by means of rods 93 (Figs. 2 and 3). Each rod has a pivotal connection 94 with the frame and extends forward across the end of the bar 86. The latter is formed with a groove 95 to receive the rod. A tension spring 97 is interposed between the bar 86 and an adjusting nut 98 threaded on the rod. A lock nut 99 holds the nut 98 in adjusted position. By adjusting the nuts 98 at opposite ends of the bar 86, the tension on the spacing strips 66 may be adjusted. The outer ends of the rods seat in bearing lugs 101, and thumb nuts 100 serve to clamp the rods in position. By loosening said nuts, the rods can be swung out of engagement with the lugs 101 and bar 86 for disassembling the parts.

At intermediate positions along the strips 66, bridges 102 extend across the conveyor over said strips. Each bridge is provided with slots 103 spaced to correspond with the spacing of the strips 66, to receive screw rods 104 attached to the strips. Adjusting nuts 105 permit the strips to be individually adjusted vertically. Each of the bridge bars 102 is formed at its ends with slots 106 to receive clamping bolts 107, this construction permitting adjustment of said bars lengthwise of the conveyor.

From the foregoing, it is obvious that quite effective means have been provided whereby the bottles or other similar ware may be transferred in plastic condition from a forming machine to an annealing leer without probability of contact as between the bottles, with the result that loss heretofore experienced, because of bottles sticking together and becoming marred or distorted because of such contact, is minimized.

Modifications may be resorted to within the spirit and scope of my invention.

What I claim is:

1. The combination with a traveling belt conveyor, of a plurality of stationary guides extending lengthwise of the conveyor and arranged to provide individual guideways along which articles on the conveyor are guided and held out of contact with each other, and tensioning devices for the guides.

2. The combination of a traveling belt conveyor, a plurality of parallel spaced guiding strips extending lengthwise of the conveyor, and means for anchoring said strips at their opposite ends including tensioning devices individual to said strips.

3. The combination of a traveling belt conveyor, a plurality of parallel spaced guiding strips extending lengthwise of the conveyor, means for anchoring said strips at their opposite ends including a tension bar extending transversely of the conveyor to which one end of each of the strips is connected, and means for holding said bar under a spring tension and thereby applying tension to said strips.

4. The combination of a traveling belt conveyor, a plurality of parallel spaced guiding strips extending lengthwise of the conveyor, means for anchoring said strips at their opposite ends including a tension bar extending transversely of the conveyor to which one end of each of the strips is connected, said bar mounted for movement lengthwise of the conveyor, and springs at opposite ends of the bar for maintaining spring tension thereon and thereby applying tension to said strips.

5. The combination of a traveling belt conveyor, a plurality of parallel spaced guiding strips extending lengthwise of the conveyor, means for anchoring said strips at their opposite ends including a tension bar extending transversely of the conveyor to which one end of each of the strips is connected, means for holding said bar under a spring tension and thereby applying tension to said strips, and separate means for individually adjusting the tensions on the several strips.

6. The combination of a traveling belt conveyor, guiding strips of sheet material extending lengthwise of the conveyor in planes perpendicular to the conveyor and spaced apart to provide individual passageways along which articles on the conveyor are guided, hooks on the ends of the strips, a supporting bar extending transversely of the conveyor to which said hooks are anchored, and means for holding said hooks against movement along the supporting bar to thereby hold the strips in spaced relation.

7. The combination of a traveling belt conveyor, guiding strips of sheet material extending lengthwise of the conveyor in planes perpendicular to the conveyor and spaced apart to provide individual passageways along which articles on the conveyor are guided, hooks on the ends of the strips, supporting means for the strips at opposite ends thereof, said supporting means being spaced above the strips and connected thereto by said hooks, a bridge extending transversely of the conveyor at a position intermediate the ends of the strips, and means slidably connected to said bridge for supporting said strips and holding them in position.

8. The combination of a traveling belt conveyor, guiding strips of sheet material extending lengthwise of the conveyor in planes perpendicular to the conveyor and spaced apart to provide individual passageways along which articles on the conveyor are guided, hooks on the ends of the strips, supporting means for the strips at opposite ends thereof, a bridge extending transversely of the conveyor at a position intermediate the ends of the strips, and individual connecting devices between the strips and said bridge for supporting the strips.

9. The combination of a traveling belt conveyor, guiding strips of sheet material extending lengthwise of the conveyor in planes perpendicular to the conveyor and spaced apart to provide individual passageways along which articles on the conveyor are guided, hooks on the ends of the strips, supporting means for the strips at opposite ends thereof, a bridge extending transversely of the conveyor at a position intermediate the ends of the strips, individual connecting devices between the strips and said bridge for supporting the strips, and means for individually adjusting said connecting devices and thereby adjusting the strips toward or from the conveyor.

10. The combination of a traveling conveyor, a plurality of parallel spaced guiding strips extending lengthwise of the conveyor, means for anchoring said strips at their opposite ends including a tension bar extending transversely of the conveyor to which one end of each of the strips is connected, means for maintaining the other ends of the strips in fixed spaced relation, and means for adjusting said bar longitudinally of the conveyor to apply varying degrees of tension to said strips.

11. The combination of a traveling belt conveyor, a plurality of stationary guiding strips extending lengthwise of the conveyor, means for anchoring said strips at their opposite ends, means for supporting portions of the strips intermediate their ends, and connections between the strips and the intermediate supporting means permitting relative longitudinal sliding movement therebetween.

12. The combination of a traveling conveyor, a plurality of stationary guiding strips extending lengthwise of the conveyor, means for anchoring said strips at their opposite ends, and independent adjustable means for supporting portions of each strip intermediate its ends.

13. The combination of a traveling conveyor, a plurality of stationary guides extending lengthwise of the conveyor, means for supporting the ends of the guides out of contact with each other and the conveyor, additional means for supporting portions intermediate the ends of the guides out of contact with each other and the conveyor, and connections between the guides and additional supporting means permitting relative longitudinal sliding movement therebetween.

14. The combination of a traveling conveyor, a plurality of stationary guides extending lengthwise of the conveyor, means for supporting the ends of the guides out of contact with each other and the conveyor, additional means for supporting portions intermediate the ends of the guides out of contact with each other and the conveyor, said additional means including a transverse bridge, and vertically adjustable screws on the bridge individual to the guides and connected thereto.

15. In combination, a supporting frame, a traveling conveyor, a plurality of parallel spaced guiding strips extending lengthwise of the conveyor, means for anchoring the strips at their opposite ends including a bar extending transversely of the conveyor and frame to which one end of each strip is connected, yieldable separable connections between the ends of the bar and said supporting frame, and means for varying the yieldability of the connections.

Signed at Toledo, in the county of Lucas and State of Ohio, this 21st day of April, 1926.

RICHARD LA FRANCE.